(12) United States Patent
Kunkel

(10) Patent No.: US 7,819,541 B2
(45) Date of Patent: Oct. 26, 2010

(54) SANITARY FITTING WITH AN ILLUMINATED OUTLET CONSISTING OF TRANSPARENT MATERIAL

(75) Inventor: Horst Kunkel, Stuttgart (DE)

(73) Assignee: Hansa Metallwerke AG, Stuttgart (DE)

( * ) Notice: Subject to any disclaimer, the term of this patent is extended or adjusted under 35 U.S.C. 154(b) by 497 days.

(21) Appl. No.: 11/885,691

(22) PCT Filed: Mar. 1, 2006

(86) PCT No.: PCT/EP2006/001848

§ 371 (c)(1),
(2), (4) Date: Sep. 5, 2007

(87) PCT Pub. No.: WO2006/094684

PCT Pub. Date: Sep. 14, 2006

(65) Prior Publication Data

US 2008/0164336 A1    Jul. 10, 2008

(30) Foreign Application Priority Data

Mar. 7, 2005 (DE) .................... 10 2005 010 349

(51) Int. Cl.
F21V 8/00 (2006.01)
F21S 8/00 (2006.01)

(52) U.S. Cl. .................... 362/96; 362/562; 362/555; 239/18

(58) Field of Classification Search .................... 362/96, 362/234, 84, 253, 551, 555, 562, 101; 239/17–20
See application file for complete search history.

(56) References Cited

U.S. PATENT DOCUMENTS

| 4,749,126 | A | 6/1988 | Kessener et al. | |
| 4,901,922 | A * | 2/1990 | Kessener et al. | 239/12 |
| 5,708,749 | A | 1/1998 | Kacheria | |
| 6,126,290 | A * | 10/2000 | Veigel | 362/96 |
| 6,375,342 | B1 * | 4/2002 | Koren et al. | 362/562 |
| 6,393,192 | B1 | 5/2002 | Koren | |
| 6,805,458 | B2 * | 10/2004 | Schindler et al. | 362/96 |
| 2002/0074420 | A1 | 6/2002 | Koren | |

FOREIGN PATENT DOCUMENTS

| AT | 004951 U1 | 1/2002 |
| DE | 3915357 A1 | 11/1990 |
| DE | 4400071 A1 | 7/1995 |
| DE | 19954180 A1 | 6/2001 |
| DE | 20102857 U1 | 7/2001 |
| DE | 10246861 A1 | 4/2004 |
| DE | 20317375 U1 | 4/2004 |
| DE | 10338885 A1 | 3/2005 |
| EP | 0181896 B1 | 9/1988 |
| EP | 1479333 A2 | 11/2004 |
| GB | 2393389 A | 3/2004 |
| WO | 0177577 A1 | 10/2001 |
| WO | 2005064231 A1 | 7/2005 |
| WO | 2006034757 A1 | 4/2006 |

* cited by examiner

*Primary Examiner*—Bao Q Truong
(74) *Attorney, Agent, or Firm*—Factor & Lake, Ltd.

(57) ABSTRACT

A sanitary fitting has a water inlet, at least one operating element and an outlet, the outlet consisting, at least in part, of a transparent material. Also provided is an illuminating device which incorporates light into the transparent material. In this way, straightforward technical means provide for a large number of new design possibilities which increase the attractiveness of the sanitary fitting for the user.

16 Claims, 3 Drawing Sheets

SANITARY FITTING WITH AN ILLUMINATED OUTLET CONSISTING OF TRANSPARENT MATERIAL

RELATED APPLICATIONS

This application claims the filing benefit of International Patent Application Ser. No. PCT/EP2006/001848, filed Mar. 1, 2006, which claims the filing benefit of German Patent Application No. 10 2005 010 349.9 filed Mar. 7, 2005; the contents of all of these applications are incorporated herein by reference.

TECHNICAL FIELD

The invention relates to a sanitary fitting having a water inlet, at least one operating element and one outlet, wherein the outlet consists, at least in part, of a transparent material.

BACKGROUND OF THE INVENTION

Sanitary fittings are known, such as single-armed lever mixers which comprise a water inlet, an operating element, which is used to adjust water volume and temperature, and an outlet. The outlet conventionally comprises sanitary fittings of this type that are made of metal. In the case of superior fittings in particular transparent materials, such as glass, are also used, however. A sanitary fitting is thus for example known in which the outlet is constructed as a glass outlet disc in which the water supply ends through a hole arranged in the disc surface of the outlet disc.

SUMMARY OF THE INVENTION

An object of the present invention is to develop a sanitary fitting of the type mentioned in the introduction. In particular an additional display facility shall be provided.

According to one embodiment of the present invention, this object may be achieved in that an illuminating device is provided which incorporates light into the transparent material.

By incorporating light into the transparent material the material acts as an optical fibre, so a portion of the light is guided inside the transparent material and exits at an opposing end face while another portion of the light exits along the light path, through the surface of the transparent material and thus gives it a striking lighting effect. A large number of new design possibilities, which increase the attractiveness of the sanitary fitting for the user, are thus opened up by simple technical means. The user can also see the outlet better particularly in poor light conditions.

The light can expediently be incorporated via an end face of the transparent material. This type of construction is easy to produce and maintain.

Alternatively the illuminating device can be embedded in the transparent material. It can thus be particularly well protected against penetration of moisture.

The illuminating device preferably comprises at least one light-emitting diode. Light-emitting diodes are extremely durable and in the meantime they have also become available in very bright forms.

In a first embodiment the outlet is constructed as a channel that is open at the top and which is at least partially lined with the transparent material.

Alternatively the base of the channel can also be made completely from the transparent material.

In a second embodiment the outlet is constructed as an outlet disc of a type known per se, in which the water supply ends through a hole arranged in the disc surface of the outlet disc. The outlet disc is made of the transparent material and the illuminating device is coupled inside the hole.

A controller is preferably provided which controls the illuminating device as a function of the operating state of the operating element. The controller can thus switch the illuminating device on if a flow of water has been triggered via the operating element. In an advantageous embodiment the controller can also control the colour of incorporated light as a function of the water temperature adjusted via the operating element. The temperature is thus easily displayed to the user.

Attractive effects may be achieved by introducing light exit surfaces, for example by engraving, into the surface of the transparent material. This allows writing or other forms to be displayed.

Particularly striking effects can also be achieved by luminescent films provided on the surface of the transparent material. Very bright objects, which owing to their brightness compared with an outlet made of transparent material give the illusion of free-floating objects, may be depicted using films of this kind.

A further advantage is achieved if the transparent material tapers in a lengthwise direction. More light then exits through the surface of the transparent material over which water flows, and this leads to even more striking light effects.

In addition a surface may be partially mirrored. This improves light guidance inside the transparent material and the portion of light exiting through the surface can be better distributed over the entire length of the outlet.

The transparent material can also be mirrored on an underside. This prevents light from exiting and thus "being lost" through the underside of the transparent material that faces away from the observer.

In a further embodiment a mirror is provided at a defined spacing below the transparent material and the illuminating device is arranged in such a way that the light is incorporated into the transparent material by multiple reflection between the mirror and the transparent material in a lengthwise direction. Impressive effects may also be achieved in this way and the luminous power exiting through a surface of the transparent material in a lengthwise direction is optimised.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

Figure 1A:
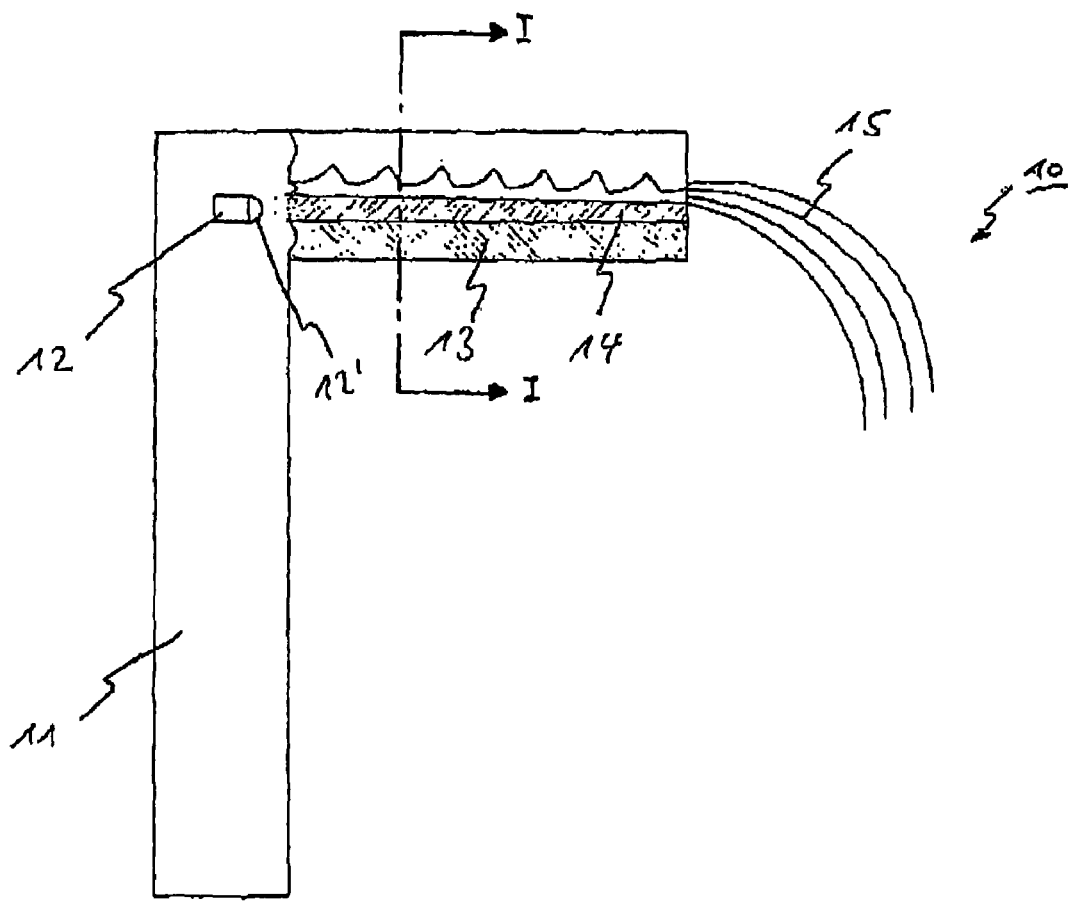
FIG. 1a shows, partially in section, a side view of a sanitary fitting according to the invention in a first embodiment.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In the first embodiment schematically shown in FIG. 1a the sanitary fitting 10 has a fitting body 11 with an outlet 13 that runs at a right angle thereto. The outlet 13 is constructed as a channel that is open at the top and of which the inside is provided with a transparent lining 14. A pair of light-emitting diodes 12 is arranged in the fitting body 11 and can incorporate light into the end face of the transparent lining 14. The sanitary fitting 10 also has an operating element of a type known per se for adjusting the volume flow rate and the temperature of a flow of water and respective hot and cold water supplies which are connected to the building-side hot and cold water supply. Operating element and water supplies are now shown in the figures since they are of no further interest here.

If a flow of water is triggered via the operating element water flows through the fitting body 11 into the outlet 13 constructed as a channel and exits at the end thereof as a jet of water 15.

Figure 1B:
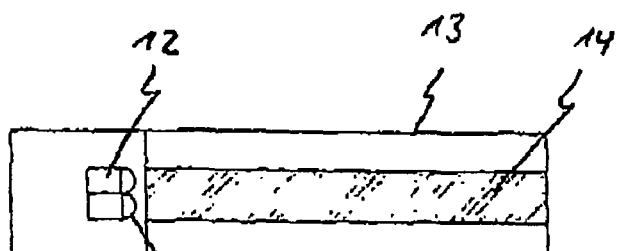
FIG. 1b shows a plan view of the sanitary fitting from FIG. 1a, FIG. 1c shows a section through the outlet of the sanitary fitting from FIG. 1a along the line I-I therein.
Figure 1C:
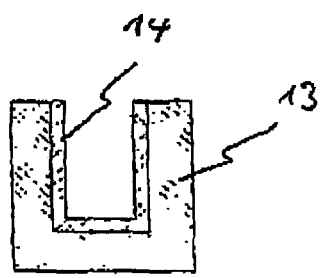

FIG. 1b shows a plan view of the sanitary fitting 10. FIG. 1c shows a section through the outlet 13. The transparent lining 14 is constructed as a U-profile in the first embodiment and covers all of the inner faces of the channel. Alternatively however only the bottom face or side faces of the channel can be covered with a "tongue" of transparent material. Glass or Plexiglas® as well as other transparent plastics materials are suitable as transparent material.

The light-emitting diodes 12 are switched on via a controller (not shown) if a flow of water has been triggered via the operating element. The light-emitting diodes 12 each have a glued on lens 12' which bundles the light of the light-emitting diodes 12 and incorporates it into the end face of the transparent lining 14. A portion of the light is guided in the transparent lining 14 along the channel and exits at the end of the outlet 13 with the jet of water 15. A further portion of the light exits along the light path through the surface of the transparent lining 14 and thus gives the flow of water flowing in the channel a pleasing glimmer.

Instead of incorporating light from outside into the end face of the transparent lining 14, the light-emitting diodes 12 can also be embedded in the transparent lining 14 and thus illuminate the lining from the inside. It is possible in particular when using transparent plastics materials as the lining 14 to mould the light-emitting diodes 12 in the transparent plastics material so they are water-tight. The light-emitting diodes 12 can equally be received in lateral indentations in the transparent lining 14.

In a further modification the channel can be slightly wider than shown in the figures and instead of a transparent lining 14 can comprise a channel base which is made completely of transparent material. The entire channel 13 can equally also be made of transparent material.

In a development of the invention the two light-emitting diodes 12 are multi-coloured light-emitting diodes which are controlled by the controller (not shown) as a function of the adjusted water temperature of the water jet 15 in such a way that the colour composition of the radiated light changes with temperature.

Figure 2:
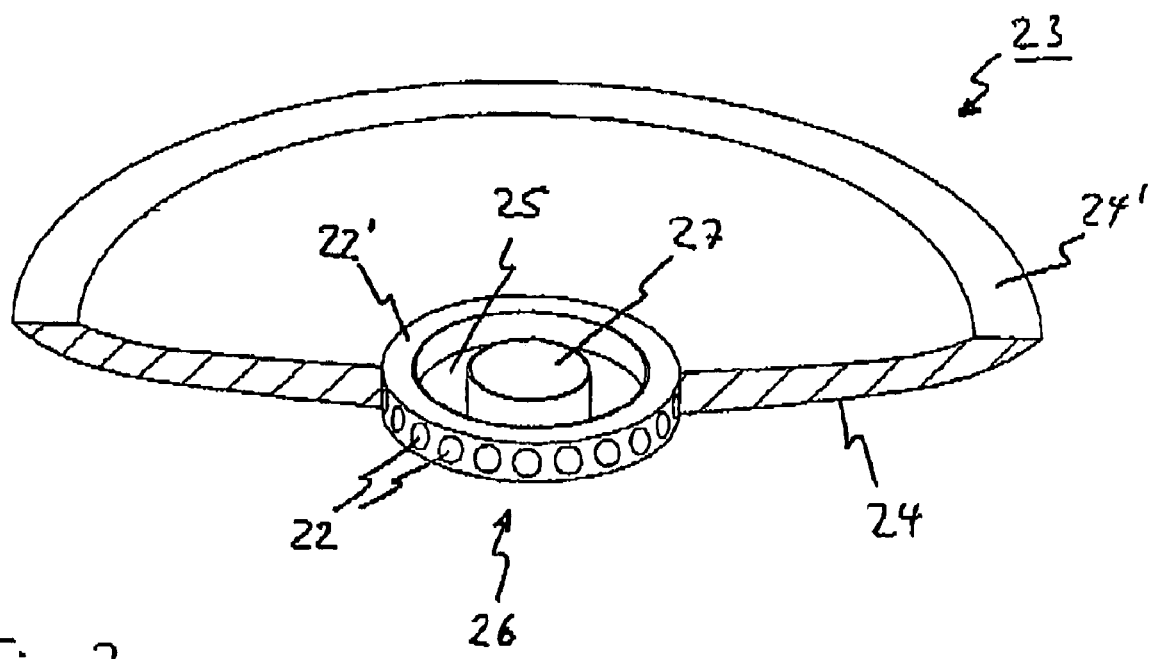
FIG. 2 shows an isometric view of a cut open outlet in the form of a glass disc for a sanitary fitting of a second embodiment.

FIG. 2 shows an outlet 23 for a sanitary fitting which comprises an outlet disc 24. For the purpose of better illustration the outlet disc 24 is shown cut open along a diameter and shown in hatched lines at the cut surface. In actual fact the outlet disc 24 is round however. The outlet disc 24 itself is made of glass and has a central hole 26. An annular holder 22' is inserted in the central hole 26 and receives a series of light-emitting diodes 22. A baffle 27 is arranged in the centre of the hole 26. When the sanitary fitting is used water can flow from a water pipe (not shown here) through the gap 25 between the baffle 27 and the holder 22' and fill the outlet disc 24. The outlet disc 24 is assembled on a fitting body in an oblique position with respect to the horizontal, so when the sanitary fitting is used a flow of water runs as a curtain over the downwardly inclined edge of the outlet disc 24. The operating element (not shown here) can also be arranged on the baffle 27.

The light-emitting diodes 22 let into the holder 22' incorporate light through the end face, along the hole 26 and into the outlet disc 24. A portion of the light is guided into the glass outlet disc 24 and exits at the outwardly directed end face 24'. Another portion of the light is scattered in the glass and exits along the light path through the surface of the outlet disc 24, and this gives a pleasing glimmer.

As in the previous embodiment the light-emitting diodes 22 are controlled by a controller (not shown).

As the outlet disc 24 is illuminated from the inside by light-emitting diodes 22 the disc itself acts as a display element. Light exit surfaces can be introduced into the outlet disc 24, for example by engraving the material using a laser. A large number of figures and patterns, such as concentric rings, are conceivable in this connection. Alternatively the outlet disc 24 can also be coated with special luminescent polyester films through which very bright objects can be displayed. The transparency of the outlet disc and the brightness of the objects can generate the illusion of objects that float freely in space. Thus for example the manufacturer's writing or the name of a hotel can be provided.

As in the first embodiment the colour of the light-emitting diodes 22 can be changed via the controller according to the temperature of the mixed water.

Figure 3:
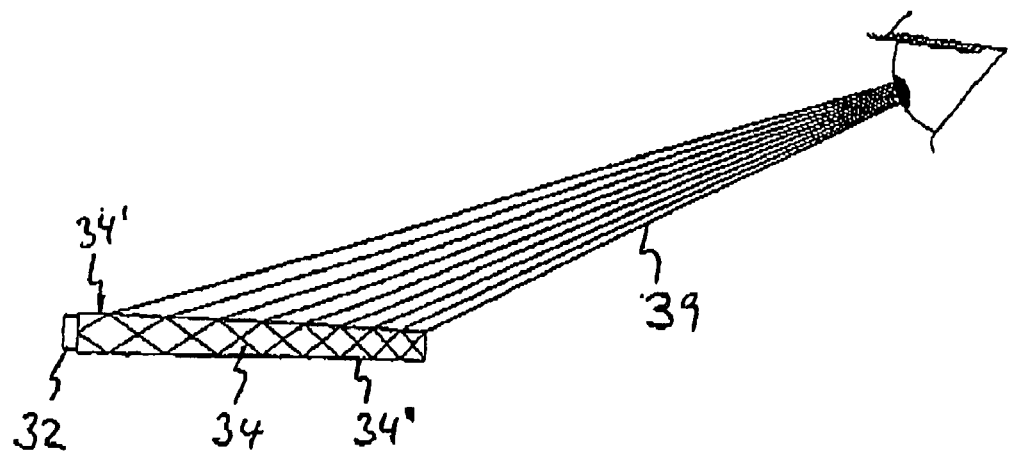
FIG. 3 shows the light guidance in a wedge-shaped, transparent element of an outlet.

FIG. 3 shows a wedge-shaped, transparent element 34 for an outlet which can be used for example as a transparent "tongue" to line the base of an outlet constructed as a channel like in FIG. 1a. A light source, for example a light-emitting diode, is provided at the left end face in FIG. 3 and incorporates light into the transparent element 34.

Multiple reflection occurs between the surfaces 34', 34" of the transparent element owing to the wedge-shaped progression. With each reflection a portion of the light 39 exits through the surface 34' while the remaining portion is reflected back into the element. This intensifies the effect of the portion of light 39 exiting through the surface 34' and which with plane-parallel surfaces is substantially due to scattering. If water flows over the surface 34' interesting light effects are demonstrated and the observer is given the impression of a "briskly moving" flow of water.

This effect may be intensified by making the surface 34' partially mirrored. With a glass body it is again sufficient to polish the surface 34' so it has a high-mirror finish since enough reflections occur at the polished interface between glass and air or water.

A further improvement may be achieved by providing mirroring on the underside 34", so no light can exit at the underside 34" and instead the light is reflected completely back into the element 34.

In a modification a mirror 48 is arranged at a defined spacing from a transparent element 44, wherein the spacing can reduce in the lengthwise direction of the element 44. The transparent element 44 is a simple glass plate in this case. The underside of the transparent element is polished to a high-mirror finish. A light source 42 emits light into the cavity between transparent element 44 and mirror 48, so multiple reflection occurs between the transparent element 44 and the mirror 48. A portion 49 of the light passes through the transparent element 44 with each reflection and is perceived by the observer.

If the water flows around or over the transparent element 44 through which light shines from below by way of the mirror, there is an additional refraction of light through the moving water. The previously steady images of the light source are thus caused to move which intensifies the impression of flowing water for the observer.

Figure 4:
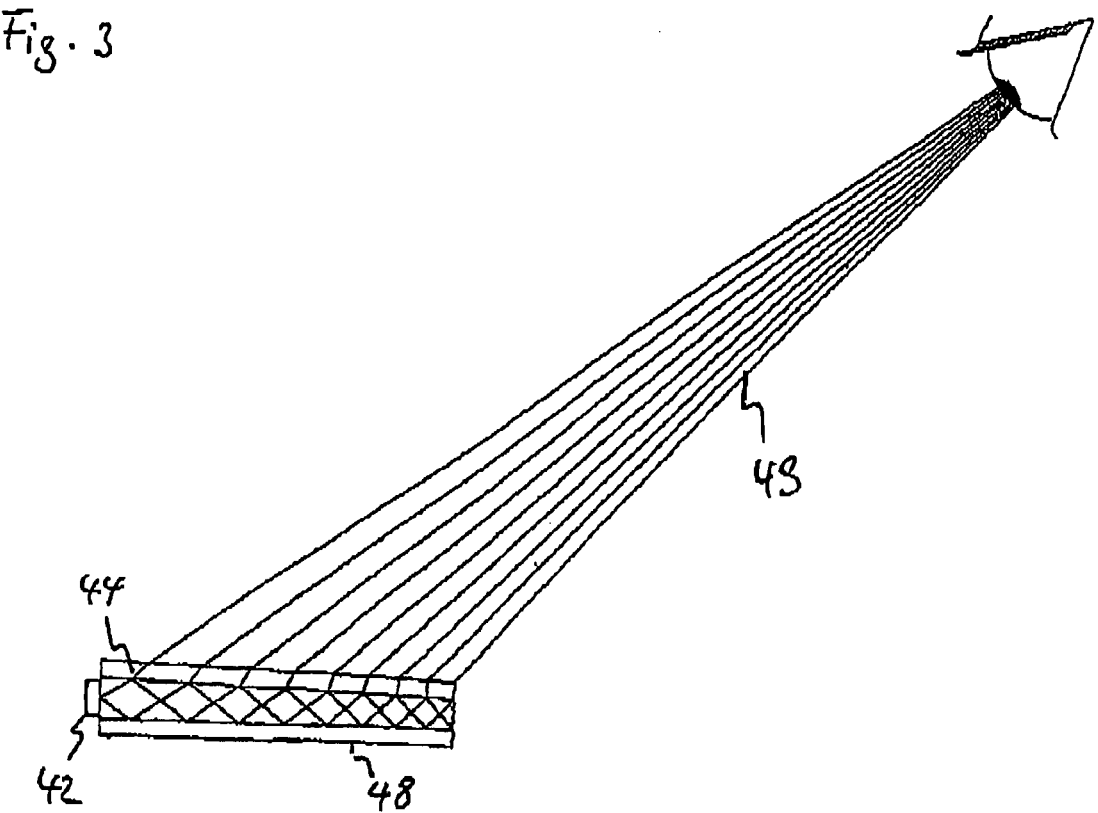
FIG. 4 shows the incorporation of light in a lengthwise direction of a transparent element of an outlet via multiple reflection at a mirror at a spacing from the transparent element.

In the arrangement shown in FIG. 4 the spacing between mirror 48 and transparent element 44 does not necessarily have to reduce. The two objects may also be arranged parallel or their spacing can even increase slightly in the lengthwise direction since corresponding multiple reflections can still occur in this case as well.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A sanitary fitting having a water inlet, at least one operating element and an outlet, wherein the outlet includes, at least in part, a transparent material, and an illuminating device which incorporates light into the transparent material and,
    wherein the outlet is constructed as a channel that is open at the top and is at least partially lined with the transparent material.

2. The sanitary fitting of claim 1, wherein illuminating device incorporates light into an end face of the transparent material.

3. The sanitary fitting of claim 1, wherein the illuminating device is embedded in the transparent material.

4. The sanitary fitting of claim 1, wherein the illuminating device comprises one or more light-emitting diode(s).

5. The sanitary fitting of claim 1, wherein the channel is open at the top and of which the base is made of the transparent material.

6. The sanitary fitting of claim 1, further comprising a controller which controls a property of the illuminating device as a function of the operating state of the operating element.

7. The sanitary fitting of claim 6, wherein the controller switches the illuminating device on if a flow of water has been triggered via the operating element.

8. The sanitary fitting of claim 6, wherein the controller controls the colour of incorporated light as a function of the water temperature adjusted via the operating element.

9. The sanitary fitting of claim 1, wherein the surface of the transparent material comprises light exit surfaces.

10. The sanitary fitting according to claim 1, wherein the transparent material tapers in a lengthwise direction.

11. The sanitary fitting of claim 1, wherein the transparent material comprises a partially mirrored surface.

12. The sanitary fitting of claim 1, wherein the transparent material comprises a mirrored underside.

13. The sanitary fitting of claim 1, further comprising a minor provided at a defined spacing below the transparent material and the illuminating device is arranged in such a way that the light is incorporated into the transparent material by multiple reflection between the mirror and the transparent material in a lengthwise direction.

14. A sanitary fitting having a water inlet, at least one operating element and an outlet, wherein the outlet includes, at least in part, a transparent material, and an illuminating device which incorporates light into the transparent material, and,
    wherein the outlet is constructed as a channel that is open at the top and of which the base is made of the transparent material.

15. A sanitary fitting having a water inlet, at least one operating element and an outlet, wherein the outlet includes, at least in part, a transparent material, and an illuminating device which incorporates light into the transparent material, and,
    wherein the outlet comprises an outlet disc made of the transparent material and in which the water supply ends through a hole arranged in the disc surface of the outlet disc, and in that the illuminating device is coupled inside the hole.

16. A sanitary fitting having a water inlet, at least one operating element and an outlet, wherein the outlet includes, at least in part, a transparent material, and an illuminating device which incorporates light into the transparent material, and,
    further comprising a mirror provided at a defined spacing below the transparent material and the illuminating device is arranged in such a way that the light is incorporated into the transparent material by multiple reflection between the minor and the transparent material in a lengthwise direction.

* * * * *